United States Patent [19]

McNamara et al.

[11] Patent Number: 4,640,544
[45] Date of Patent: Feb. 3, 1987

[54] VEHICLE CONSTRUCTION

[76] Inventors: James R. McNamara, RMB 20, Whorouly, Victoria 3735; Denis L. Piazza, Whalleys Lane, Myrtleford, Victoria 3737, both of Australia

[21] Appl. No.: 662,743

[22] Filed: Oct. 19, 1984

[30] Foreign Application Priority Data

Oct. 19, 1983 [AU] Australia ............................. PG1917

[51] Int. Cl.⁴ .............................................. B60P 1/00
[52] U.S. Cl. .................................... 296/181; 296/100; 160/88; 52/71
[58] Field of Search ............... 296/181, 183, 155, 100; 104/249, 260; 160/88, 117, 118, 159; 105/378, 393, 215 C, 377; 220/6, 7; 52/64, 71

[56] References Cited

U.S. PATENT DOCUMENTS

| | | | |
|---|---|---|---|
| 1,138,814 | 5/1915 | Von Schluembach | 220/6 |
| 1,405,485 | 2/1922 | Callery | 105/378 |
| 1,543,452 | 6/1925 | Seitz et al. | 105/215 C |
| 2,023,886 | 12/1935 | Hoffman | 220/6 |
| 2,071,840 | 2/1937 | Keller | 160/88 |
| 3,155,419 | 11/1964 | Garson et al. | 296/181 |
| 3,252,730 | 5/1966 | Chieger et al. | 296/181 |
| 3,254,786 | 6/1966 | Melville | 220/6 |
| 4,342,480 | 8/1982 | Ross, Jr. | 296/100 |

FOREIGN PATENT DOCUMENTS

2273702 6/1976 France ................ 296/155
1062056 12/1983 U.S.S.R. .

Primary Examiner—David A. Scherbel
Assistant Examiner—Carol L. Olson
Attorney, Agent, or Firm—Larson & Taylor

[57] ABSTRACT

An enclosure adapted for use on a trailer or a vehicle flat bed comprising at least two panels on each side of the trailer, one end of the first panel of each side being hingedly connected to the trailer, or an extension therefrom, the panels being hingedly connected to each other, the other ends of the second panel of each side being connected to a frame assembly which extends across the width of the trailer, the frame assembly being adapted for selective movement along the trailer whereby the panels can be moved from a first position, where they are located along the side of the trailer, to a position where the panels on each side extend across the trailer and are in face to face relationship.

14 Claims, 14 Drawing Figures

VEHICLE CONSTRUCTION

This invention relates to a vehicle construction and, particularly, to enclosures for use on trailers or vehicle flat beds.

There are applications where it is essential that a trailer or vehicle flat bed, hereinafter for convenience called a trailer, needs to be enclosed.

Two specific areas are when the trailer is to be used as a stock crate, where the animals being transported have to be securely enclosed, or, when it is to be used as a bulk grain bin. Another use can be when it is to be used as an enclosed goods carrying vehicle.

Heretofore, when trays were to be used for these purposes they were normally dedicated to the purposes. Thus, if, say, a trailer was to be used as a stock crate, and this example will be used throughout the remainder of the specification but without in any way limiting the generality of the application of the invention, then it was normally set up permanently as a stock crate. This was quite satisfactory, of course, when it was loaded with animals, but, when, say, the animal cargo has been discharged, it was difficult, if not commercially infeasible, to load the vehicle with any other goods as the only way of loading was through the rear and this prevented, say, loading of pallets from the side.

Thus, on most occasions, crates, when not carrying animals, were driven empty and it will be appreciated that, on occasions, this could mean travelling hundreds or thousands of kilometers with no load whatsoever.

Such crates were, on occasions, removeable, particularly where used on smaller vehicles, but this did not basically overcome the problem, although it did enable the owner of the vehicle to remove the stock crate and use the trailer as a flat tray vehicle. However, if the vehicle was any distance from its depot, it would still, of course, be necessary to travel empty as the crate must, normally, be returned to the depot.

It is the principal object of this invention to provide an enclosure for a trailer which enables the conventional use of the trailer but which can readily be resited to permit at least a substantial part of the total area of the trailer to be used as a tray vehicle.

A further object is to provide a vehicle fitted with such an enclosure.

The invention, in its broadest sense, provides an enclosure adapted for use on a trailer or a vehicle tray comprising at least two panels on each side of the trailer, one end of the first panel of each side being hingedly connected to the trailer, or an extension therefrom, the panels being hingedly connected to each other, the other ends of the second panel of each side being connected to a frame assembly which extends across the width of the trailer, the frame assembly being adapted for selective movement along the trailer whereby the panels can be moved from a first position, where they are located along the side of the trailer to a position where the panels on each side extend across the trailer and are in face to face relationship.

Preferably one of the panels connected to the trailer or tray has its connection in the direction of the longitudinal axis of the trailer or tray forwardly or rearwardly of the other and the other panel of each pair is connected to the frame assembly rearwardly or forwardly of the other, whereby, when the panels are in the second position, the panels fold so that they do not foul or come into contact with each other.

Preferably the frame assembly is provided with a wheel assembly on each side thereof, the wheel assembly being adapted to be constrained to move along a track on the trailer or tray and being moveable from a first position where the wheel is in contact with the track and can rotate relative thereto, to a second position where it is out of such contact and the frame assembly is fixed.

Preferably there are a number of frame assemblies between each pair of which there are two panels on each side, the panels being moveable, as described hereinbefore.

The invention also relates to a vehicle having an enclosure of the type hereinbefore described located thereon.

In order that the invention may be more readily understood, we shall describe, with reference to the accompanying drawings, one particular form of trailer made in accordance with the invention and certain possible modifications thereof.

Whilst the first module 20 will be stated to be at the front 21 of the trailer, it will be appreciated that the invention can equally well be applied if the first module terminates at the rear of the trailer, or it would be possible, but we believe possibly not commercially satisfactory, to have the effective connection point in the centre of the trailer.

At the forward end of the trailer we provide a frame 22 which can be permanently or removeably connected to the front of the trailer. As this frame has to bear load forces, we prefer to make it of a truss, the cord 23 of which effectively terminates along the front of the trailer, with the remainder 24 extending forwardly therefrom.

We may prefer to provide extensions from the forward end of the trailer to which this truss is connected so as to provide a strut or restraint against turning moments.

This frame 22 may be made of metal components sheathed with a sheeting material, for example of angle iron with metallic sheet attached thereto, but, as will be described hereinafter, different forms of construction are perfectly satisfactory.

This frame 22 is adapted to have a panel 30, 31 hingedly connected, each to one side thereof, the panels 30, 31 being first of a pair of panels, the other panels of the pair being panels 32, 33.

The panels of each pair are hingedly connected together, at 34, 35 and the free end of the second panels are, in turn, hingedly connected to a frame assembly 40. The actual construction of the panels is not critical to the invention but they may be of metal rods, bars or the like or be metal framed and have a sheathing.

On one side of the front member, the hinge 36 to which the adjacent panel is connected can be considered effectively at the inner forward edge of the member, whereas, on the other side, there is rearwardly directed extension 37, to the free end of which a hinge 38 is connected.

The length of the extension 37 is such as to be slightly longer than the thickness of two panels when they are sandwiched one against the other, as will be described more fully hereinafter.

At the point of connection to the frame assembly 40, the panel 33 on the side which has the extension 37 at the front member is connected by hinge 42 to the inner surface of the frame assembly, whereas the panel 32 on the other side is connected by hinge 43 to a forward extension 41 from the frame assembly, which extension 41 is of the same length as the rearward extension 37 from the other side of the front member. It will be seen thus, that the arrangement, in plan, is rectangular with the hinges 36, 42 on one diagonal being at the corners and the hinges 38, 43 on the other diagonal being spaced rearwardly and forwardly from the adjacent corner by the same amount.

This arrangement is such that, inward movement of the panels about their centre hinges 34, 35, causes the frame assembly 40 to move forwardly, and this forward movement is continued so that each pair of the panels 30, 32 and 31, 33 move about their connection hinges 34, 35 towards each other in such a way that movement continues until the panels 30, 32 on the side where they are directly pivotally connected to the front member 23 assume a position where the inner surface of the first panel 30 effectively abuts the front member 23 and the second panel 32 abuts what was the outer surface of the first panel 30 and the panels 31, 33 on the other side adopt a similar position but spaced rearwardly of the first panels 30, 32 because of the rearward extension 37 to which the forward hinge 38 is connected.

The frame assembly 40 also adopts a similar, but mirror image, position relative to the panels, that is that the two sets of panels are located one ahead of the other with the rearward panel 33 abuts the frame assembly 40 and its adjacent panel 31 and the other panels 30, 32 being spaced therefrom with this being achieved by the forward extension 30, 32 on the frame assembly 40.

Figure 5:
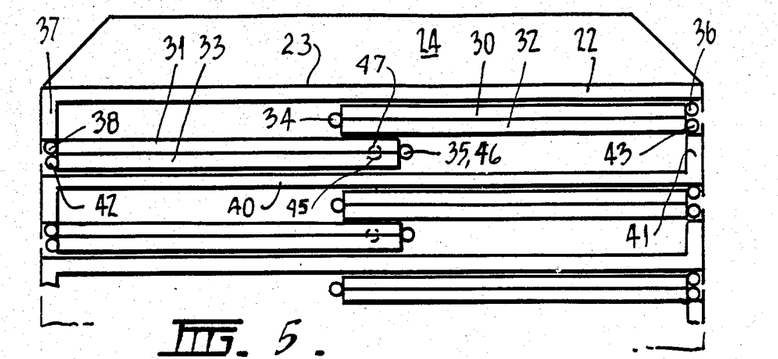
FIG. 5 is a view of the trailer of FIG. 4 shown in its fully folded position.

This position is best illustrated in FIG. 5 and it can be seen that the frame assembly 40 is in a position spaced from the front member by a spacing which is of the order of thickness of the four panels.

As illustrated, the length of each of the panels is more than half the width of the trailer and, in order to ensure that the folding operation is controlled, instead of hinge 35 between panels 31, 33 being a simple hinge, we prefer to make it a composite hinge having links 45 which are hingedly connected between the end of panel 31 and part way along the length of panel 33.

The hinge 34 between panels 30, 32 is a simple hinge.

This arrangement permits the panels 30, 32, on movement about their hinge 34, to move inwardly prior to the inward movement of the panels 31, 33 as these panels can initially adopt a position which is delayed forward movement because of the movement of the link 45.

Figure 4:
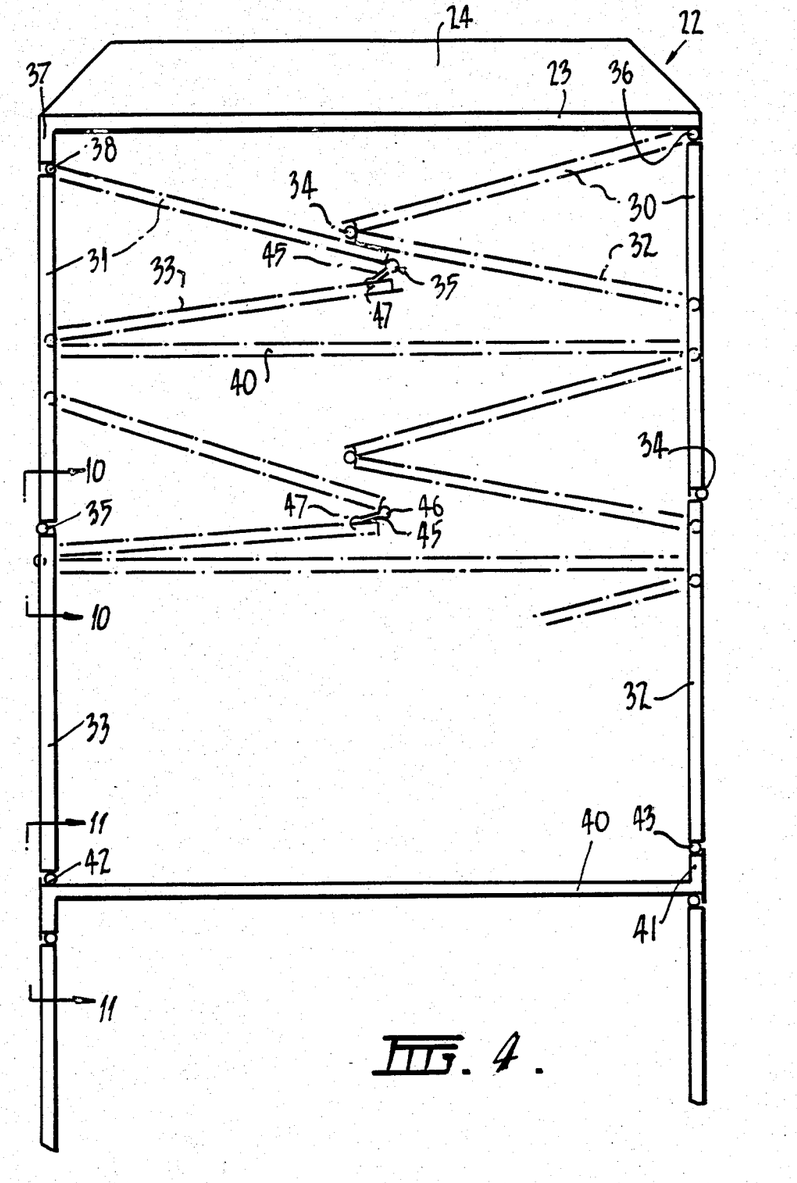
FIG. 4 is a partial plan view of the trailer showing, in solid line, the trailer being configured as a stock crate and, in chain-dash line, the steps of folding the components of the trailer.

The various stages of movement can be seen from the chain-dashed lines on FIG. 4.

When the panels are completely folded, as illustrated in FIG. 5, it will be seen that the panels 31, 33 closely abut and the hinge 46 is inwardly directed. The hinge 47 and the link 45 lie parallel with the panel 33.

Figure 6:
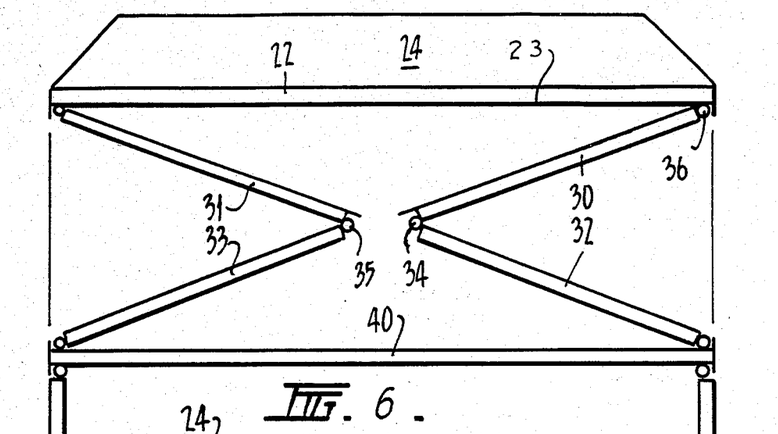
FIG. 6 is a view showing the folding operation of a trailer where the wings are less than half of the width of the trailer.
Figure 7:
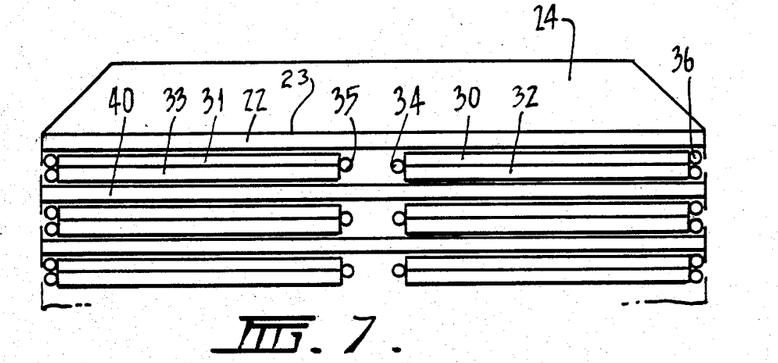
FIG. 7 is a plan view of the trailer of FIG. 6 showing the various components folded.

If the length of each panel is less than half of the width of the vehicle, which for a semi-trailer normally be between 2.4 and 2.5 meters, being the maximum allowable width, the arrangement can be as illustrated in FIGS. 6 and 7 and is such that the panels, in fact, can be located side by side rather than one behind the other. In this case the hinges 34, 35 can both be simple hinges and it will be seen that there is no necessity for the provision of the rearward extension 37 from the frame 22 or the forward extension 41 from the frame assembly 40.

Figure 8:
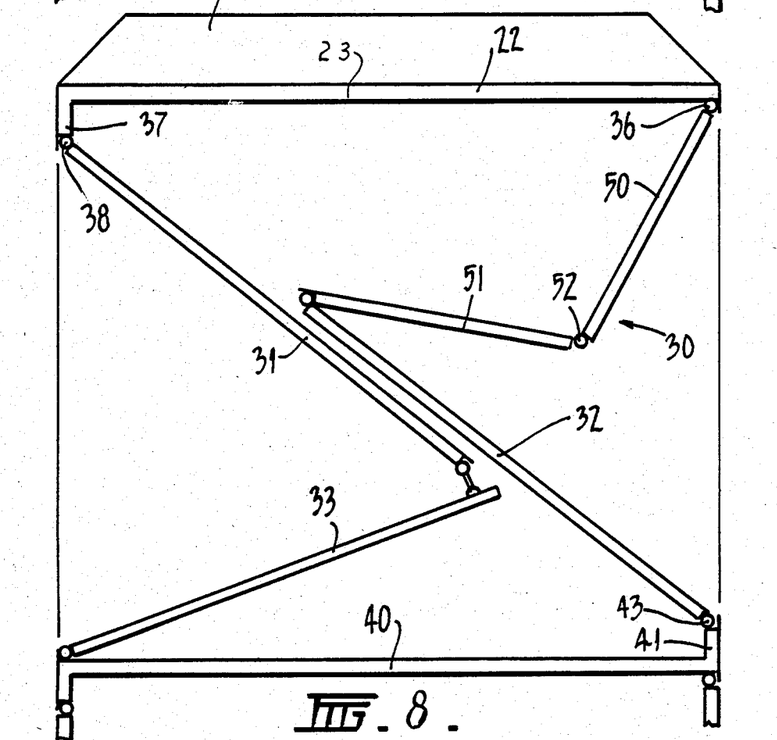
FIG. 8 is a view similar to FIG. 4 where the wings are substantially longer than half the width of the trailer and showing the method in which this configuration is folded.
Figure 9:
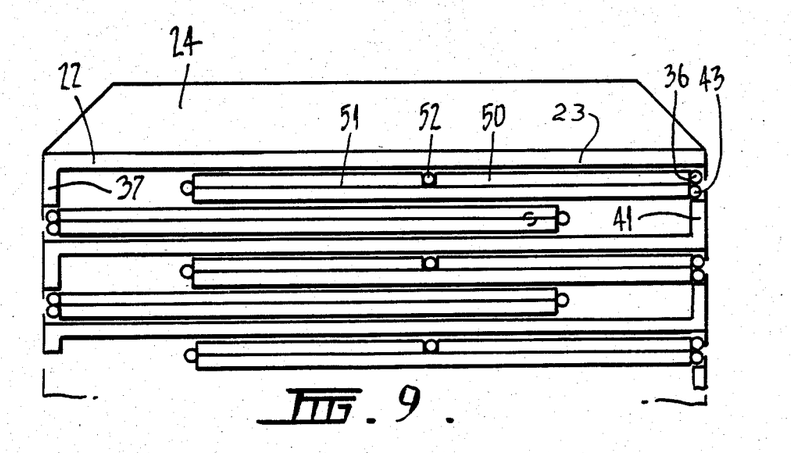
FIG. 9 is a view of the trailer of FIGS. 5 and 7 where the wings have been folded.
Figures 10, 11:
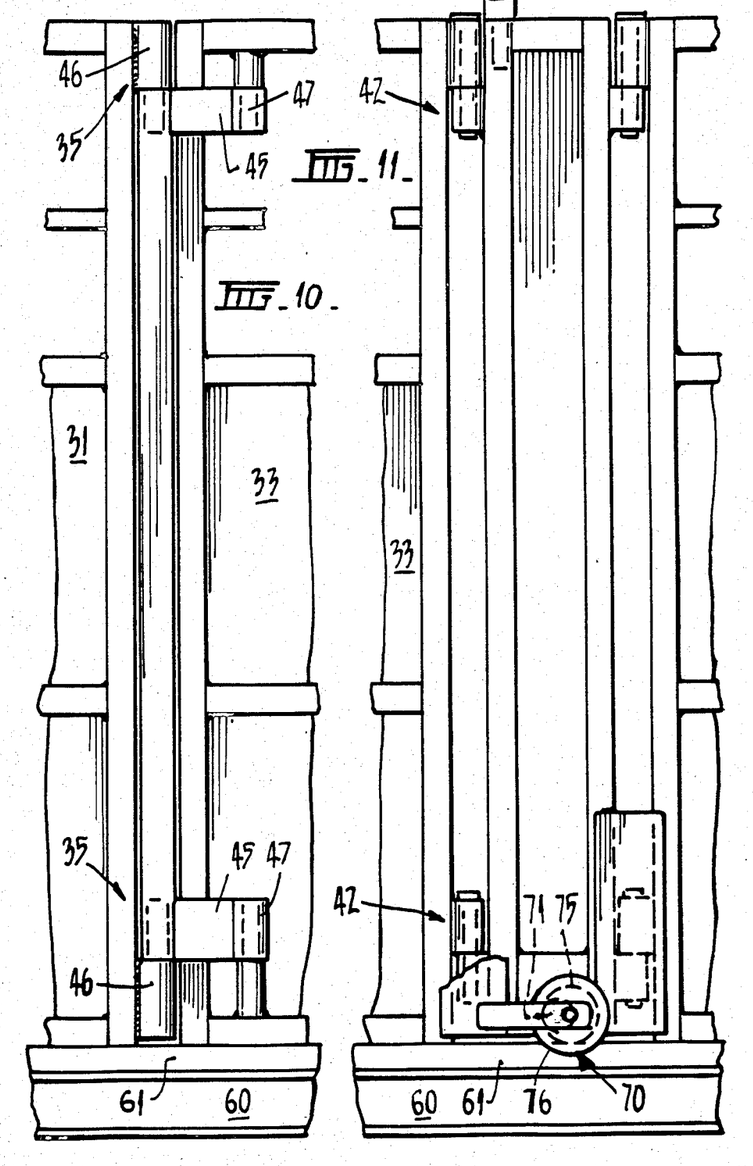
FIG. 10 is a partial side elevation view of the trailer of the invention along line 10—10 of FIG. 4.
FIG. 11 is a view similar to that of FIG. 10 but along the line 11—11 of FIG. 4.

If the effective length of the panels between adjacent frame members is to be longer than that illustrated in FIGS. 4 and 5, we may use an assembly similar to that illustrated in FIGS. 8 and 9.

In this arrangement the forward panel 30 is formed of two panels 50, 51 which are hingedly connected together at 52, whilst the panels 31, 33 are effectively identical to those panels as shown in FIGS. 4 and 5, as is the hinge and link connection used therebetween.

In this construction the frames 22, 40 are, of necessity, provided with extension members 37, 41.

As can be seen from FIG. 8, the folding movement of this form of construction is relatively complex but, nevertheless, the front face of the components comprising panel 30 terminate in a position abutting the front member 23 and the final position, illustrated in FIG. 9, can be seen to be effectively identical to the arrangement shown in FIG. 5, with the exception that the degree of overlap of the panels is substantially greater than in the earlier figure.

It will be seen from consideration of the three different embodiments that the invention is basically flexible in the spacing between frame members along the length of a semi-trailer.

It will be appreciated that, in some applications, it is preferred to have these frame members more closely located than in other applications and the required spacing, once determined, determines the actual form of panels to be adopted.

Whilst we have described herein the physical movement of the components, it will, of course, be appreciated that, in order to effect this, the frame assembly 40 must be able to move relatively freely along the length of the trailer. At the same time, the assembly must be stable in both the extended and closed or folded position, and easy to move between these positions.

FIGS. 10 to 13 illustrate the arrangement adopted.

We provide, along the coaming 60 of the vehicle, on each side, a rail 61, and, at the lower side of the frame, we prefer to provide an angle member, one flange 62 of which, when at rest, abuts the top of the rail and the other flange 63 inside wall 64 thereof.

It will be appreciated that as the two sides of the frame assembly are effectively identical, the two downwardly directed flanges 63 of the angle members prevent undesired lateral movement of the frame.

In order to permit easy movement of the frame, we provide a cam member 70 above the angle member which comprises an inner cylindrical member 71 of a first, larger, diameter, journalled in the frame and adapted to be rotatable therewith and which has extending outwardly therefrom a smaller diameter cylindrical member having its axis displaced from the axis of the larger member.

This smaller diameter member carries a guide wheel assembly 75 which may have a downardly directed flange 76 on its outer surface and which is adapted to rest on the top of the rail 61 with the flange 76 extending on the outer side thereof.

Figure 12:
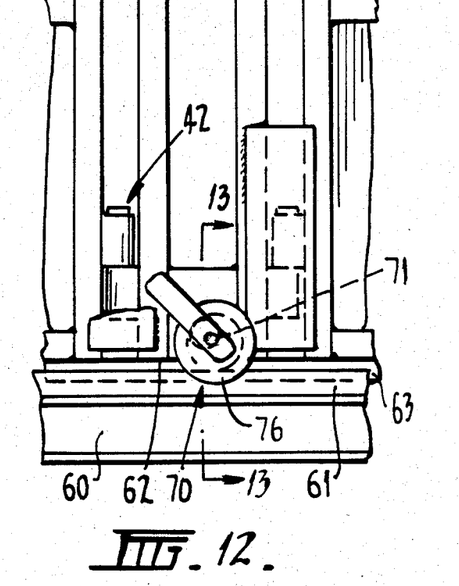
FIG. 12 is a partial view of the lower portion of FIG. 11 showing the components in a condition where they can be moved.
Figure 13:
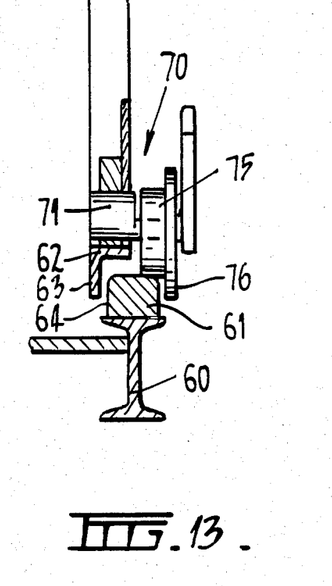
FIG. 13 is a view along line 13—13 of FIG. 12 showing the configuration of the cam action of the wheel.

Depending on the position of the larger diameter member relative to the smaller diameter member, so the effective height of the smaller diameter member above the base of the frame assembly varies and the arrangement can be such that, when this height is at its maximum, as illustrated in FIGS. 12 and 13, the wheel 75 is not in contact with the rail 61 and the frame assembly 40 is located.

If, however, the cam member is rotated, the effective height of the axis of the wheel drops, the wheel 75 comes into load bearing contact with the rail 61 and lifts the frame assembly 40. When this is done on each side, the frame 40 is then free to move along the rail and is prevented from untoward axial movement by the flanges 63 of the angle members 62 on the inner surfaces and the flanges 76 of the wheels 75 on the outer surface.

Thus, by simple rotation of the two cam members 70 associated with the frame assembly 40, so the frame assembly can be put into a condition where it can be freely moved either forwardly, to cause a folding movement of the panels, or rearwardly, to cause the panels to unfold.

In each case, when the frame has reached its required position, further rotation of the cam assembly causes the frame to seat on the rail 61 and the wheel 75 to be moved out of contact therewith.

At this time, by use of bolts, clamps or the like, not illustrated, the assembly can be locked.

As previously stated, the construction of a single module was described to enable ascertainment of the method of operation of the invention but it will be appreciated that these modules can be repeated with the rear of the frame assembly 40 being effectively the same as the front member, and so on. This can readily be seen from FIG. 4.

Over the length of a semi-trailer we may, as illustrated, provide four individual modules or pens each, say, 3 meters long, giving a total length of crate of approximately 12 meters.

In this case, in order to fold the crate it is only necessary to release the retaining means which hold the units to the trailer, rotate the cam members 70 associated with each pair of panels and commence to move the whole assembly forwardly. Each pair of panels then folds as described in respect of the single module.

We have found that this folding operation can readily be done by users.

When each of the frame members has been moved forwardly and the folding completed, the whole of the crate is compressed into a substantially small volume having a base length, say, of the order 1.2 to 1.5 meters. This is well illustrated in FIG. 3. The assembly can then be locked.

This then leaves the remainder of the tray of the trailer free to able to be loaded from either side, thus overcoming the previous disadvantage of being effectively unable to back load with stock crates.

Also, because the amount of space occupied when in the folded condition is relatively small, it may well be economic to leave the crate in situ on most occasions and, thus, should a stock load become available for back loading, it is only necessary to reform the crate by unfolding the panels.

The frame assemblies 40 may take any required form.

For example, they could be open or, if required, could be closed and be provided with gates so that animals can be held in relatively restricted areas. This, of course, is most desirable if only a partial load is being carried.

Also, it may be desirable to provide means whereby the enclosure is stabilised when in its extended condition.

Several different methods may be used for this.

Figure 2:
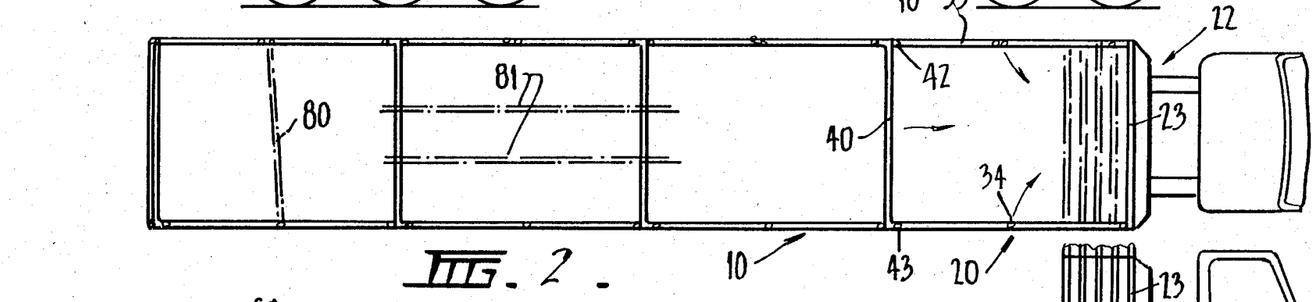
FIG. 2 is a plan view of the trailer of FIG. 1.

The first is to provide bow members which are adpated to extend across the width of the trailer and, preferably, these can fit into sockets provided adjacent the hinge pins of the panels, whereby each individual pair of panels is held at a required position against either outward or inward movement. One such bow member 80 is shown in FIG. 2.

Any such bow members must be removed before the assembly is closed, but as they have a width equivalent only to the width of the vehicle they can readily be stored.

In an alternative arrangement we may provide tension wires or the like, for example, to provide a triangle associated with each compartment defined between two frame assemblies with direct interconnection between the sides.

These would give the required stability against outward movement but would basically not have to be removed when the assembly is being folded.

Another way of ensuring stability is to provide a catwalk, or catwalk lengths, which can connect over the top of the panels to serve a dual purpose of ensuring that the panels are retained in their extended position but, at the same time, permitting the operator ready access for inspection of the interior of the trailer. One such catwalk length 81 is shown, for exemplification, in FIG. 2.

Further, whilst we said that it was basically feasible for users to close and open the enclosure of the invention, it may be preferred that a hand or power winch be provided which can effect both the opening and closing operation and it will be appreciated that by using a winch this could readily be done by one person.

If required, it would be feasible to provide a second sheep deck, or even a second cattle deck, by providing the deck members in a removeable or hinged form, the decks being removed or folded before the enclosure is folded. If such an arrangement was provided, it may be necessary to modify the assembly so as to provide storage space for the deck members.

For example, it would be feasible to slightly extend the forward and rearwardly directed members to provide additional space for the stowage of the deck components.

Figure 14:
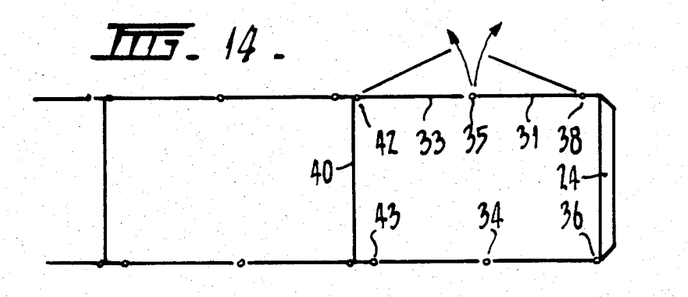
FIG. 14 is a schematic plan view of one modification of the trailer of the invention; and Referring now to the Figures the enclosure of the invention is effectively modular and we shall first describe the fitting and location of a first module 20 to a trailer 10 and then the location of further modules.

FIG. 14 shows a modified form of panel arrangement which is particularly applicable for some applications.

For example, it may be required that the contents of the trailer, when it is used for back loading, should be surrounded, say to permit the location of a tarpaulin or the like thereover, or, and more particularly, it may be necessary to meet the requirements of the law, that the contents be surrounded. This is specifically the case where, if a trailer is being used to carry bricks, as bricks are not, at the present time, permitted to be exposed when being transported.

To now, it has been necessary to provide removeable gates to encompass such loads but, by modification of the embodiment previously referred to, it is possible to fully load the trailer whilst, at the same time, using the stock crate as a surround.

This is done by permitting the panels of at least the forward module to be able to be alternatively hinged, as described earlier herein, or for the hinges 34, 35 to be alternatively disconnected to permit the panels to be hinged outwardly about the hinges 36, 38, 42, 43. This possibility is shown in chain-dash lines in FIG. 14.

Figure 3:
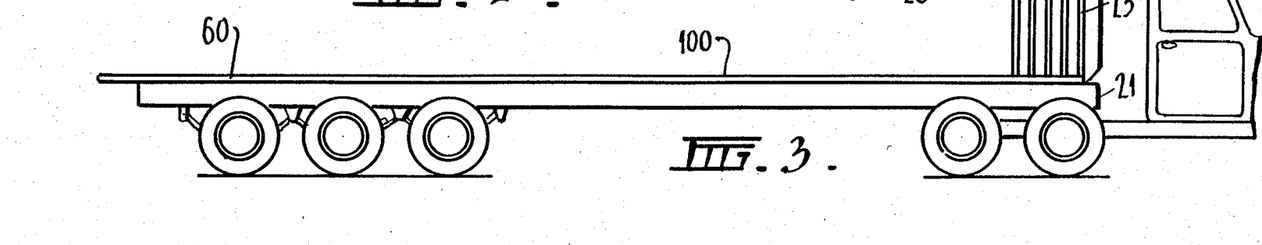
FIG. 3 is a view similar to that of FIG. 1 but showing the trailer as a flat bed vehicle with the stock crate components folded.

If this can be done, it will be seen that it would be possible to load the trailer of the vehicle, when it is in the condition shown in FIG. 3, provided the loading effectively commences behind the point marked 100. That is effectively three-quarters of the trailer of the vehicle could be loaded with material on pallets or the like.

Figure 1:
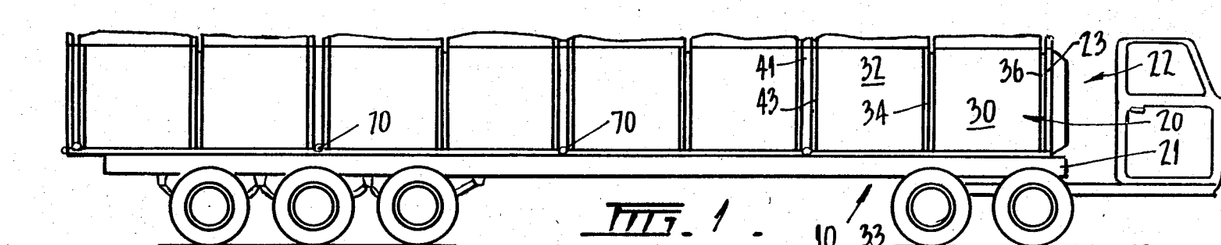
FIG. 1 is a side elevation of the trailer of the invention configured as a stock crate.

When loading is completed, the stock crate is then formed by moving the frame members 40 rearwardly which, in turn, causes the panel members to open out until the condition illustrated in FIG. 1 is achieved.

At this time, then, the load is fully surrounded by the stock crate but the front quarter of the trailer is empty.

If, however, the forward panels 30, 31, 32, 33 are rotated outwardly by disconnection at their hinges 34, 35, then the forward 25% of the trailer can be loaded from the side by a fork lift or the like and, when this is loaded, then the panels are returned to their hinged condition previously described.

When the trailer is to be unloaded, it is necessary that the operation be reversed, that is that the forward panels are swung open so that the forward portion of the trailer can be unloaded, at which time, the normal closing operation can be effected. Once this is done, the other three-quarters of the load is exposed and can be removed.

It will be appreciated that, if required, the various pairs of panels can be permitted to open in this way so that, when the crate is about the trailer but general cargo is required to be removed from the trailer, then any required panel pair can be opened to give access to the trailer.

As indicated earlier in this specification, the particular materials of construction are not part of the invention.

Whereas steel angles and other components are satisfactory, the assembly could be fabricated from steel pipe or it could be fabricated from sheet material without framing, and this method is the most likely one if aluminium is to be used. These sheet members would need to be folded and provided with means whereby the hinge member assemblies could be connected and this, of course, is a conventional working of such materials in the art.

The invention could also be applied to foldable containers in applications other than on vehicles. For example, if a grain bin was occasionally required in a building or stock pens were on occasions required in an area where permanent yards would be undesirable, the enclosure of the invention could be used.

Whilst we have illustrated, for example in relation to FIGS. 5, 7 and 9, pluralities of identical panels, it will be appreciated that the types of panels can be mixed on the one vehicle, providing the opposite pairs of panels are the same.

We claim:

1. An enclosure adapted for use on a trailer or a vehicle flat bed comprising at least first and second panels on each side of the trailer, one end of the first panel of each side being hingedly connected to the trailer, or an extension therefrom, the panels on each side being hingedly connected to each other, a frame assembly extending transversely across the width of the trailer rearwardly of said second panels, the other ends of the second panel of each side being hingedly connected to said frame assembly, the frame assembly being movable longitudinally along the trailer to move the panels on each side from a first position, where they are located along the side of the trailer, to a position where these panels on each side move inwardly to extend across the trailer with the normally outwardly facing surfaces of the panels facing each other.

2. An enclosure as claimed in claim 1 wherein each panel has a length equal to less than half the width of the trailer so that, when extending across the trailer in said second position, the panels from one side lie in the same transverse plane as the panels of the other side.

3. An enclosure as claimed in claim 1 wherein each panel has a length equal to more than half the width of the trailer, the panels being arranged so that, when they extend across the trailer, the panels of one pair are located forwardly, taken longitudinally along the trailer, relative to the panels of the other pair.

4. An enclosure as claimed in claim 3 wherein the first panel on one side is hingedly connected to the trailer at a position which is farther rearwardly than the hinged connection at the other side by a distance substantially equal to the thickness of two panels.

5. An enclosure as claimed in claim 4 wherein the second panel on the other side is hingedly connected to the frame at a position which is farther forwardly than the hinged connection at the other side by a distance substantially equal to the thickness of the two panels.

6. An enclosure as claimed in claim 3 wherein the hinged connection between the two panels which are rearwardly located when extending across the trailer includes a link to which each of the panels is hingedly connected so that, when the two pairs of panels are pivotting about their hinges, the forward pair cross the centre of the trailer without contacting the rearward pair.

7. An enclosure as claimed in claim 6 wherein the forward panel of the two panels which are forwardly located when extending across the trailer is formed of two sub-panels which are hingedly connected.

8. An enclosure as claimed in claim 1 including rails extending along each side of the trailer said frame assembly being selectively located to rest on the rails or to be moved therealong.

9. An enclosure as claimed in claim 8 including a cam member connected to the enclosure and associated with each rail, each of which cam members carries a wheel adapted for selective engagement with the rail on rotation of the cam member to effect said selective location of the frame member with the rails, whereby, when the wheels are engaged with the rail, the frame member can be moved therealong.

10. An enclosure as claimed in claim 1 wherein the hinged connection between at least one pair of panels is separable to permit the panels to be rotated independently about the hinged connection to the trailer or the frame.

11. An enclosure as claimed in claim 1 wherein there is more than one pair of panels on each side of the trailer.

12. An enclosure as claimed in claim 1 when affixed to a trailer or vehicle flat bed.

13. An enclosure as claimed in claim 11 wherein the enclosure is located on a surface.

14. A trailer or vehicle having an enclosure as claimed in claim 1.

* * * * *